(12) United States Patent
Cheng

(10) Patent No.: US 10,088,871 B2
(45) Date of Patent: Oct. 2, 2018

(54) DISPLAY SCREEN ASSEMBLY AND TERMINAL

(71) Applicant: GUANGDONG OPPO MOBILE TELECOMMUNICATIONS CORP., LTD., Dongguan (CN)

(72) Inventor: Jiao Cheng, Dongguan (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 15/452,316

(22) Filed: Mar. 7, 2017

(65) Prior Publication Data

US 2017/0177032 A1    Jun. 22, 2017

Related U.S. Application Data

(63) Continuation of application No. PCT/CN2016/077549, filed on Mar. 28, 2016.

(30) Foreign Application Priority Data

Apr. 20, 2015    (CN) .......................... 2015 1 0189560

(51) Int. Cl.
*H05K 7/00* (2006.01)
*G06F 1/16* (2006.01)

(52) U.S. Cl.
CPC .......... *G06F 1/1637* (2013.01); *G06F 1/1601* (2013.01); *G06F 1/1626* (2013.01); *G06F 1/1656* (2013.01)

(58) Field of Classification Search
CPC ................................................... G02F 1/1333

USPC ...................................................... 361/679.01
See application file for complete search history.

(56) References Cited

U.S. PATENT DOCUMENTS

| | | | |
|---|---|---|---|
| 2008/0049168 A1* | 2/2008 | Kubota | G02B 6/0021 349/65 |
| 2008/0297685 A1 | 12/2008 | Sugibayashi et al. | |
| 2009/0153465 A1 | 6/2009 | Shinn et al. | |
| 2012/0113331 A1* | 5/2012 | Takata | G02B 6/0043 348/790 |

FOREIGN PATENT DOCUMENTS

| | | |
|---|---|---|
| CN | 202495013 U | 10/2012 |
| CN | 202835074 U | 3/2013 |
| CN | 103139340 A | 6/2013 |

(Continued)

OTHER PUBLICATIONS

International Search Report issued for PCT/CN2016/077549 dated Jul. 1, 2016. (4 pages).

(Continued)

*Primary Examiner* — Jerry Wu
(74) *Attorney, Agent, or Firm* — Young Basile Hanlon & MacFarlane, P.C.

(57) ABSTRACT

The present disclosure provides a display screen assembly and a terminal. The display screen assembly includes a display screen and a frame. The display screen includes a display surface. The display surface is provided with a display region and a non-display region, and the non-display region surrounds the display region. The frame is provided with a frame flange on an inner side, the frame flange at least partly shields the non-display region.

14 Claims, 3 Drawing Sheets

(56) References Cited

FOREIGN PATENT DOCUMENTS

| | | |
|---|---|---|
| CN | 204066085 U | 12/2014 |
| CN | 104866020 A | 8/2016 |
| FR | 2923070 A1 | 5/2009 |
| JP | 2014138131 A | 7/2014 |
| WO | 2014061573 A1 | 4/2014 |

OTHER PUBLICATIONS

First Office Action received for Priority Application No. CN 201510189560.0 (filed Apr. 20, 2015) dated Aug. 2, 2016. (4 pages).
Extended European Search Report issued in corresponding European application No. 16782541.3 dated Feb. 27, 2018.

\* cited by examiner

DISPLAY SCREEN ASSEMBLY AND TERMINAL

CROSS REFERENCE TO RELATED APPLICATIONS

This application is a continuation application of international Patent Application PCT No. PCT/CN2016/077549, entitled "DISPLAY SCREEN ASSEMBLY AND TERMINAL", filed on Mar. 28, 2016, which claims priority to Chinese Patent Application No. 201510189560.0, entitled "DISPLAY SCREEN ASSEMBLY AND TERMINAL", filed on Apr. 20, 2015, contents of all of which are hereby incorporated by reference in their entireties.

TECHNICAL FIELD

The present disclosure relates to display screen technical field, and particularly to a display screen assembly and a terminal.

BACKGROUND

For a mobile phone, a front surface of a display screen generally includes an appearance surface of a frame and an appearance surface of a transparent protective plate. The appearance surface of the frame surrounds the appearance surface of the transparent protective plate. The appearance surface of the transparent protective plate generally includes an ink region and a display region. The ink region is formed by coating an ink layer on the periphery of an inner side of the transparent protective plate. The ink layer shields a periphery region of the display screen which cannot display images. The display region is a region of the transparent protective plate which can effectively cause the images of the display screen to be viewable. Generally, when no power is supplied to the screen of the mobile phone, the appearance surface of the frame, the ink region, and the display region show different black colors, thus easily leads to multi-level, the vision is complex and not simple, visual effect is affected, and it is not ergonomic.

SUMMARY

In view of this, the present disclosure provides a display screen assembly and a terminal.

In a first aspect, a display screen assembly is provided. The display screen assembly may include a display screen and a frame. The display surface may include a display region and a non-display region, and the non-display region surrounds the display region. The frame is provided with a frame flange on the display screen, the frame flange at least partly shields the non-display region.

In a second aspect, a terminal is provided. The terminal includes the above display screen assembly.

For the display screen assembly and the terminal of the present disclosure, the inner side of the frame is provided with the frame flange, and the frame flange shields the non-display region correspondingly, thus the periphery of the inner side of the transparent protective plate does not need to be coated with an ink layer, that is, for the appearance of the display screen assembly, only the case frame and the display region of the display screen are viewable, visual hierarchies of the display screen assembly are reduced, and the frame of the display screen assembly does not include black ink edges, thus the visual effect of the display screen assembly is improved.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Persons skilled in the art can derive other accompanying drawings from these accompanying drawings without creative effort.

Figure 1:
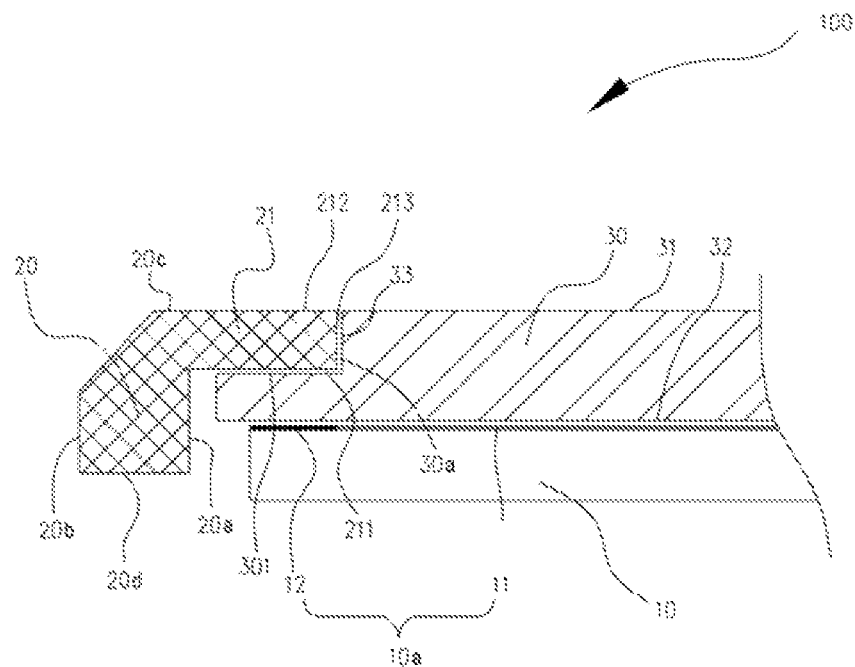
FIG. 1 is a diagrammatic view of a display screen assembly in accordance with a first embodiment of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

The technical solution of embodiments of the present disclosure will be described clearly and completely in combination with the accompanying drawings of the embodiments of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Referring to FIG. 1, the present disclosure provides a display screen assembly 100. The display screen assembly 100 includes a display screen 10, a frame 20, and a transparent protective plate 30. The display screen 10 includes a display surface 10a. The display surface 10a is provided with a display region 11 and a non-display region 12. In FIG. 1, the display region 11 is indicated by a gray region, and the non-display region 12 is indicated by a black region. The non-display region 12 surrounds the display region 11. The frame 20 is provided with a frame flange 21 on an inner side of the frame 20. The frame flange 21 has an orthogonal projection thereof on the display surface 10a at least partly overlapped with the non-display region 12. The frame flange 21 at least partly shields the non-display region 12 along a direction substantially perpendicular to the display region 11. The frame flange 21 is secured to the display surface 10a. A periphery of the transparent protective plate 30 is secured to the frame 20. A surface of the transparent protective plate 30 close to the display screen 10 at least covers the display surface 10a.

The frame flange 21 shields the non-display region 12 correspondingly, thus the periphery of the inner side of the transparent protective plate 30 does not need to be coated with an ink layer, that is, for the appearance of the display screen assembly 100, the frame 20 and the display region 11 of the display screen 10 are viewable, visual hierarchies of the display screen assembly 100 are reduced, and the frame of the display screen assembly 100 does not include black ink edges, thus the visual effect of the display screen assembly 100 is improved. It can be understood that the display screen assembly 100 is applied in a terminal device. The terminal device can be a mobile phone, a laptop computer, a tablet computer, an electronic reader, an electronic album, a display, and so on.

The display surface 10a is provided on a side of the display screen 10 adjacent to the transparent protective plate 20. The display region 11 is a region of the display screen 10 which can display image information. The non-display region 12 is a region of the display screen 10 which cannot display image information. Generally, circuits or backlights are arranged in the non-display region 12. When no power is provided to the display screen 10, the display region 11 is black. The display screen 10 can be a liquid crystal display (LCD), and can also be an LCD module (LCM) assembly. The display screen 10 is a touch screen which can be widely used. For example, the display screen 10 can be an in-cell touch screen a touch layer of which is embedded into liquid crystal pixels, can also be an on-cell touch screen a touch layer of which is embedded into liquid crystal pixels, and can also be a one glass solution (OGS) touch screen a touch control layer of which is fully attached to a cover plate.

In an embodiment, the frame 20 can be made of plastic materials and can support the display screen 10 and the transparent protective plate 30. If the display screen 10 is a touch display screen, the frame 20 can be a weak polar substance. In addition to the good insulation performance, the frame 20 can also be configured to transfer fingerprint sensing electric field. The frame 20 is a rectangular ring. The frame 20 includes an inner surface 20a and an outer surface 20b which are arranged opposite each other. The inner surface 20a is used to fix the periphery of the transparent protective plate 30. The outer surface 20b is configured to be secured to the terminal device, or is used as the appearance surface of the frame 20. Specifically, the frame 20 can further include a top surface 20c and a bottom surface 20d fixed between the inner surface 20a and the outer surface 20b. The top surface 20c is arranged opposite to the bottom surface 20d, and the top surface 20c and the outer surface 20b constitute the appearance surface (not indicated) of the frame 20. The appearance surface can be a smooth surface or a blending surface, and a corner angle can be formed between the top surface 20c and the outer surface 20b. The frame flange 21 is provided on the inner surface 20a, the projecting direction of the frame flange 21 is parallel to the display surface 10a. The frame flange 21 can be directly secured to the non-display region 12 by adhesive, and can also be indirectly secured to the non-display region 12, that is, the frame flange 21 is secured to the transparent protective plate 30, and the transparent protective plate 30 is secured to the display region 11.

In an embodiment, the transparent protective plate 30 is transparent glass. A cross section of the transparent protective plate 30 is parallel to the display surface 10a of the display screen 10. The transparent protective plate 30 is rectangular. The transparent protective plate 30 includes a top surface 31 and a bottom surface 32 which are arranged opposite each other. The top surface 31 faces a user, and is used as an appearance surface of the transparent protective plate 30. The bottom surface 32 departs from the user, and the bottom surface 32 at least covers the display surface 10a. Both the top surface 31 and the bottom surface 32 are parallel to the display surface 10a. The transparent protective plate 30 can enhance the light transmission of the display screen 10 and enhance visual effects of the display screen assembly 100. The surface of the transparent protective plate 30 close to the display screen 10 at least covers the display surface 10a, thus the display screen 10 is fully protected by the transparent protective plate 30. On one hand, the transparent protective plate 30 can be adapted to various display screens, for example, can be adapted to a display screen having a curving display surface, and can also be adapted to a flexible bendable display; on the other hand, the structure of the display screen assembly 100 is simple, thus labor force is reduced. The transparent protective plate 30 further includes a sidewall 33 between the top surface 31 and the bottom surface 32. The sidewall 33 can be fixedly connected to the frame 20. The sidewall 33 resists against the inner side of the frame 20, thus transverse compression resistance of the frame 20 and the transparent protective plate 30 is improved. Furthermore, the transparent protective plate 30 is a transparent rigid plate. When the glass plate 30 and the frame 10 are in good combination, internal components of the terminal can be protected well, and good light transmission performance can be realized.

Furthermore, reference continues to FIG. 1, a first embodiment is provided. One surface of the transparent protective plate 30 away from the display screen 10 corresponds to the display region 11. That is, an orthogonal projection of the display region 11 on the surface of the transparent protective plate 30 away from the display screen 10 is the same as the surface of the transparent protective plate 30 away from the display screen 10.

In the embodiment, the frame flange 21 includes a shielding surface 211 correspondingly fitting to the non-display region 12, and a viewable surface 212 provided opposite to the shielding surface 211. The shielding surface 211 is fixed to the transparent protective plate 30 by adhesive, or can also be fixed to the transparent plate 30 via screws, or the shielding surface 211 and the transparent protective plate 30 can also be arranged to be spaced apart from each other. The viewable surface 212 is adjacent to the top surface 20c. The viewable surface 212 and the top surface 20c together form a smooth appearance surface, thus the appearance surface of the frame 20 is smooth, the frame 20 is comfortable to hold, and the appearance visual effect of the frame 20 is improved. The frame flange 21 can further include a connection surface 213 fixed between the shielding surface 211 and the viewable surface 212. The connection surface 213 is fixed to the periphery of the transparent protective plate 30. The connection surface 213 can be fixed to the transparent protective plate 30 by adhesive, or can also be fixed to the transparent protective plate 30 in an integrally molded manner.

In the embodiment, the periphery of the transparent protective plate 30 is provided with an engaging structure 30a. The engaging structure 30a can be a step relative to the top surface 31 and facing the frame flange 21. The frame flange 21 is positioned on the engaging structure 30a. The engaging structure 30a is matched with the frame flange 21 and engages with the frame flange 21. Specifically, the engaging structure 30a is adjacent to the top surface 31, and the step of the engaging structure 30a is substantially paralleling to the top surface 31. The engaging structure 30a includes a bearing surface 301 close to the display screen 10. The bearing surface 301 fits to the shielding surface 211. The engaging structure 30a can bear and secure the frame flange 21, such that the structure of the display screen assembly 100 can be simple and stable, and the display screen assembly 100 can be easy to produce. The groove 30a can be formed by performing a milling machine process on the periphery of the transparent protective plate 30, or can also be formed by compositing two translucent plates. The top surface 31 is flush with a viewable surface 212, thus the appearance surface of the display screen assembly 100 is smooth, seamless effect can be achieved, and the visual effect of the display screen assembly 100 is enhanced. The bottom surface 32 fits to the display region 11 correspondingly. The bottom surface 32 is a flat surface. The display region 10a is coated with an optical adhesive layer (not illustrated). The optical adhesive layer is adhesive between the bottom surface 32 and the display region 10a. The optical adhesive layer covers the display region 11 and the non-display region 12 correspondingly. By fixedly connecting the transparent protective plate 30 to the display screen 20 via the optical adhesive layer, on one hand, the stable structure of the display screen assembly 100 can be improved, on the other hand, by fitting the transparent protective plate 30 to the display screen 10 directly, no gap exists between the display screen 10 and the transparent protective plate 30, thus the display surface 10a is free of dust and impurities, and the display effect of the display screen assembly 100 is improved.

Figure 2:
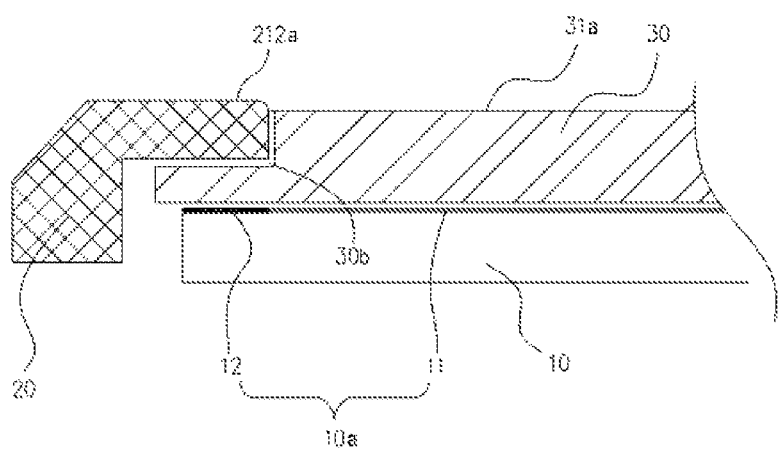
FIG. 2 is a diagrammatic view of a display screen assembly in accordance with a second embodiment of the present disclosure.

Referring to FIG. 2, a second embodiment is provided. The second embodiment is similar to the first embodiment, and a difference is that another step is formed between a top surface 31a of the transparent protective plate 30 and a viewable surface 212a of the frame 20. Specifically, the viewable surface 212a is higher than the top surface 31a, that is, the top surface 31a of the transparent protective plate 30 is recessed toward the display screen 10 relative to the viewable surface 212a. By means of the structure, the transparent protective plate 30 can be protected, scratches of the transparent protective plate 30 can be avoided, and the lifespan of the display screen assembly 100 can be prolonged. Furthermore, by means of the structure, the frame 20 and the transparent protective plate 30 can be easily differentiated, thus the visual hierarchy effect of the display screen assembly 100 is improved, and simple effect can be realized.

Figure 3:
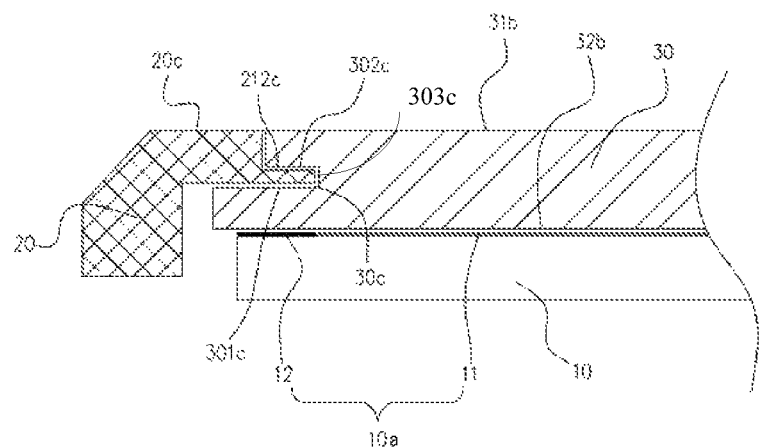
FIG. 3 is a diagrammatic view of a display screen assembly in accordance with a third embodiment of the present disclosure.

Referring to FIG. 3, a third embodiment is provided. In the third embodiment, the periphery of the transparent protective plate 30 is provided with an engaging structure 30c. Relative to the engaging structure 30a of the first embodiment, the engaging structure 30c further includes a cover surface 302c opposite to a bearing surface 301c of the engaging structure 30c. The cover surface 302c and the bearing surface 301c cooperatively define a receiving groove 303c therebetween. The receiving groove 303c faces the flange 21. The flange 21 includes a top surface 20c and a viewable surface 212c, and the viewable surface 212c is lower than the top surface 20c, such that additional step is formed. Specifically, the top surface 20c is flush with the top surface 31b of the transparent protective plate 30, and the viewable surface 212c is received in the receiving groove 303c and faces the cover surface 302c. By means of the structure, the display screen assembly 100 can ensure that the appearance surface of the display screen assembly 100 is smooth, and can also ensure that the structure of the transparent protective plate 30 and the frame 20 is stable, and the size of the appearance surface of the transparent protective plate 30 can be increased, thus good visual effect of the display screen assembly 100 can be realized.

Furthermore, referring to FIG. 1, in the first embodiment, the transparent protective plate 30 and the frame 10 are integrally molded. Specifically, a glass raw material plate of the transparent protective plate 30 can be obtained by pressing roll molding, and the transparent protective plate 30 can be obtained via a cutting process. The transparent protective plate 30 is placed in a mold cavity of an injection mold, and the frame 20 is integrally injected onto the transparent protective plate 30 by an injection molding process. Thus, the connection surface 213 can better fit to the sidewall 33, the viewable surface 212 and the top surface 31 are in the same mold cavity, the surfaces formed by the viewable surface 212 and the top surface 31 are more smooth, and the structures of the frame 20 and the plate 30 are much stable. In other embodiments, if the frame 20 is made of metal material, the glass plate can be placed in the mold cavity of a mold, and liquid metal is injected into the mold, thus the frame and the glass plate are integrally molded.

Furthermore, in the first embodiment, the thickness of the transparent protective plate 30 is 0.3-2.0 mm. By means of the transparent protective plate 30, the strength of the display screen assembly 100 is enough, and the display screen assembly 100 is thinner, thus thinner terminal devices can be obtained.

Figure 4:
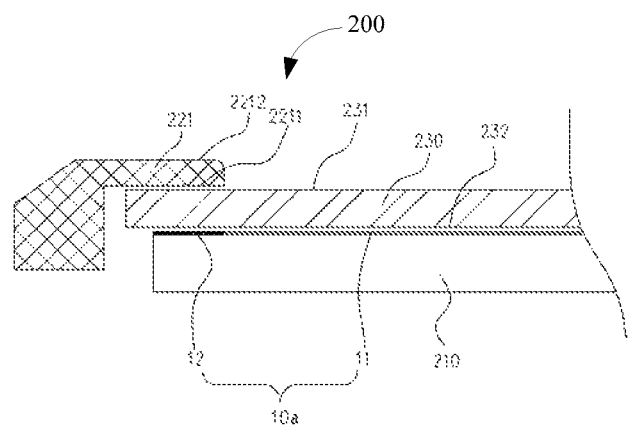
FIG. 4 is a diagrammatic view of a display screen assembly in accordance with a fourth embodiment of the present disclosure.

Furthermore, referring to FIG. 4, a fourth embodiment is provided. The surface of the transparent protective plate 230 away from the display screen 210 corresponds to one surface of the transparent protective plate 230 close to the display screen 210. That is, the surface of the transparent protective plate 230 away from the display screen 210 is the same as the surface of the transparent protective plate 230 close to the display screen 210. The frame flange 221 is laminated on the top surface 231.

In an embodiment, the viewable surface 2212 of the frame flange 221 and the top surface 231 form a step, the shielding surface 2211 fits to the periphery of the top surface 231, and shields the non-display region 12 correspondingly. An orthographic projection region of the display surface 10a on the bottom surface 232 is smaller than the bottom surface 232. Thus, the protection area of the transparent protective plate 230 to the display screen 210 is larger, the appearance visual hierarchy effect of the display screen assembly 200 is stronger, the region division is more apparent, the transparent protective plate 230 can be well protected, and water and dust proof effect of the display screen assembly 100 (see FIG. 1) is better.

Figure 5:
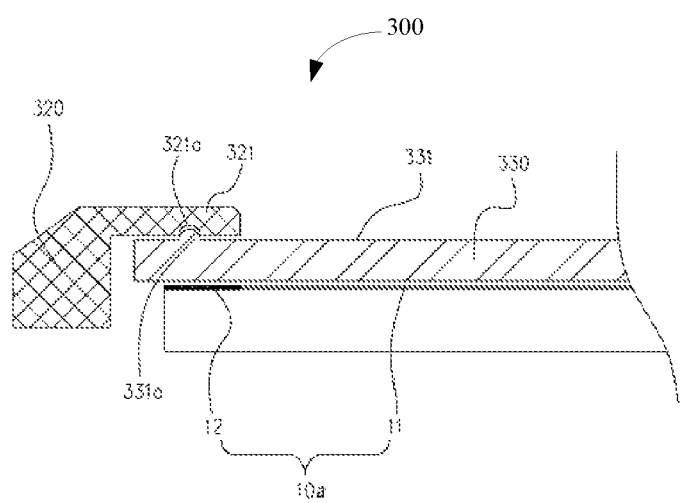
FIG. 5 is a diagrammatic view of a display screen assembly in accordance with a fifth embodiment of the present disclosure.

Furthermore, referring to FIG. 5, a fifth embodiment is provided. The fifth embodiment is similar to the fourth embodiment, and a difference is that a depression 321a is provided on one side of the frame flange 321 close to the transparent protective plate 330. The transparent protective plate 330 is provided with a protrusion 331a corresponding to the depression 31a, and the protrusion 331a is received in the depression 321a. Specifically, a plurality of depressions 321a are provided on the shielding surface 3211, and a plurality of protrusions 331a are provided on the periphery of the top surface 331 correspondingly. The depression 321a can be a rectangular groove, or can be a hemispherical groove, or can be further a tapered groove. The protrusion 331a is matched with the depression 321a. When the frame flange 321 is laminated on the top surface 331, the protrusion 331a is received in the depression 321a, thus, on one hand, the structure of the transparent protective plate 330 and the frame 320 is more stable, and the structure performance of the display screen assembly 300 is improved; on the other hand, positioning of the transparent protective plate 330 to the frame 320 can be realized. In other embodiments, the depression 321a can be provided on the sidewall 33 (see FIG. 1) of the transparent protective plate 330, and the protrusion 331a can be provided on the connection surface of the frame flange 321, thus the combination of the transparent protective plate 330 and the frame 320 can be realized.

The present disclosure further provides a terminal (not illustrated). The terminal includes the display screen assembly 100. The terminal further includes a rear cover (not illustrated) and a control assembly (not illustrated). The rear cover is provided with a receiving cavity (not illustrated). An open end of the receiving cavity is located on the appearance surface of the rear cover. The display screen assembly 100 covers the open end. The display screen 10 and the control assembly are received in the receiving cavity. The control assembly is electrically coupled to the display screen 10 to control the display screen 10. It can be understood that the terminal can be a mobile phone, a laptop computer, a tablet computer, an electronic reader, an electronic album, a display, and so on.

For the display screen assembly and the terminal of the present disclosure, the inner side of the frame is provided with the frame flange, and the frame flange shields the non-display region correspondingly, thus the periphery of the inner side of the transparent protective plate does not need to be coated with an ink layer, that is, for the appearance of the display screen assembly, only the case frame and the display region of the display screen are viewable, visual hierarchies of the display screen assembly are reduced, and the frame of the display screen assembly does not include black ink edges, thus the visual effect of the display screen assembly is improved. The foregoing descriptions are exemplary embodiments of the present disclosure. It should be noted that persons skilled in the art can make improvements and polish without departing from the principle of the present disclosure, and these improvements and polish shall fall within the protection scope of the present disclosure.

What is claimed is:

1. A display screen assembly comprising: a display screen comprising a display surface, the display surface comprising a display region and a non-display region, and the non-display region surrounding the display region; a frame being provided with a frame flange on the display screen, the frame flange at least partly shielding the non-display region; and a transparent protective plate, wherein a periphery of the transparent protective plate is secured to the frame, the transparent protective plate comprises a bottom surface close to the display screen, and the bottom surface at least covers the display surface, wherein the periphery of the transparent protective plate is provided with an engaging structure, the engaging structure is a step facing the frame flange, and the frame flange is positioned on the engaging structure; and an area of an orthogonal projection of the display region to form the step on a surface of the transparent protective plate away from the display screen is the same as that of the surface of the transparent protective plate away from the display screen.

2. The display screen assembly of claim 1, wherein the bottom surface is bonded to the display surface via optical adhesive, and the optical adhesive covers the display region and the non-display region.

3. The display screen assembly of claim 1, wherein an area of an orthogonal projection of the display surface is smaller than that of a surface of the transparent protective plate closest to the display screen.

4. The display screen assembly of claim 1, wherein the step is formed between the frame flange and the transparent protective plate to cause the transparent protective plate to be recessed toward the display screen relative to the frame.

5. The display screen assembly of claim 1, wherein the engaging structure comprises a cover surface and a bearing surface opposite to the cover surface, the bearing surface is close to the display screen, the cover surface and the bearing surface cooperatively define a receiving groove therebetween, the flange comprises a top surface and a viewable surface lower than the top surface, the top surface of the flange is flush with a top surface of the transparent protective plate away from the display screen, and the viewable surface is received in the receiving groove and faces the cover surface.

6. The display screen assembly of claim 1, wherein the frame flange is laminated on the transparent protective plate to form the step.

7. The display screen assembly of claim 1, wherein one side of the frame flange close to the transparent protective plate is provided with a depression, the transparent protective plate is provided with a protrusion corresponding to the depression, and the protrusion is received in the depression.

8. The display screen assembly of claim 1, wherein the transparent protective plate is glass.

9. The display screen assembly of claim 1, wherein the transparent protective plate and the frame are integrally formed.

10. The display screen assembly of claim 1, wherein a thickness of the transparent protective plate is 0.3 mm~2.0 mm.

11. A terminal comprising: a display screen comprising a display surface, the display surface comprising a display region and a non-display region, and the non-display region surrounding the display region; a frame provided with a frame flange on the display screen, the frame flange having an orthogonal projection thereof on the display surface at least partly overlapped with the non-display region; and a transparent protective plate, wherein a periphery of the transparent plate is secured to the frame, the transparent protective plate comprises a bottom surface close to the display screen, and the bottom surface at least covers the display surface, wherein the periphery of the transparent protective plate is provided with an engaging structure, the engaging structure is a step facing the frame flange, and the frame flange is positioned on the engaging structure; and an area of an orthogonal projection of the display region to form the step on a surface of the transparent protective plate away from the display screen is the same as that of the surface of the transparent protective plate away from the display screen.

12. The terminal of claim 11, wherein the engaging structure comprises a cover surface and a bearing surface opposite to the cover surface, the bearing surface is close to the display screen, the cover surface and the bearing surface cooperatively define a receiving groove therebetween, the frame flange comprises a top surface and a viewable surface lower than the top surface, the top surface of the frame flange is flush with a top surface of the transparent protective plate away from the display screen, and the viewable surface is received in the receiving groove and faces the cover surface.

13. The terminal of claim 11, wherein the frame flange is laminated on the transparent protective plate to form the step.

14. The terminal of claim 11, wherein one side of the frame flange close to the transparent protective plate is provided with a depression, the transparent protective plate is provided with a protrusion corresponding to the depression, and the protrusion is received in the depression.

* * * * *